（12）United States Patent
Kubo

(10) Patent No.: US 8,156,912 B2
(45) Date of Patent: Apr. 17, 2012

(54) VEHICLE INCLUDING A VARIABLE INTAKE PIPE LENGTH DEVICE

(75) Inventor: Katsuhiro Kubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 750 days.

(21) Appl. No.: 12/334,857

(22) Filed: Dec. 15, 2008

(65) Prior Publication Data

US 2009/0165740 A1  Jul. 2, 2009

(30) Foreign Application Priority Data

Dec. 28, 2007 (JP) ................................. 2007-340643

(51) Int. Cl.
*F02M 35/10* (2006.01)
(52) U.S. Cl. .............................. 123/184.55; 123/184.53
(58) Field of Classification Search ............. 123/184.53, 123/184.55
See application file for complete search history.

(56) References Cited

FOREIGN PATENT DOCUMENTS

| DE | 10120218 A1 | 1/2003 |
|---|---|---|
| EP | 1777386 A1 | 4/2007 |
| JP | 58181930 U | 12/1983 |
| JP | 59167926 U | 11/1984 |
| JP | 2006017923 A | 1/2006 |
| JP | 2007-218243 A | 8/2007 |

*Primary Examiner* — Noah Kamen
(74) *Attorney, Agent, or Firm* — Westerman, Hattori, Daniels & Adrian, LLP

(57) ABSTRACT

Disclosed herein is a vehicle including a variable intake pipe length device capable of adjusting the length of an intake pipe according to the condition of an engine, the intake pipe being provided in an intake passage for inducing air from an air cleaner box to an intake port of the engine, the intake pipe including a fixed funnel and a movable funnel movable relative to the fixed funnel by a driving force of an actuator, wherein the actuator is located inside of an envelope formed by the contour of the intake pipe.

16 Claims, 17 Drawing Sheets

VEHICLE INCLUDING A VARIABLE INTAKE PIPE LENGTH DEVICE

TECHNICAL FIELD

The present invention relates to a vehicle including a variable intake pipe length device.

BACKGROUND OF THE INVENTION

An intake device for a vehicle utilizes the effects of intake inertia, intake pulsation, and intake resonance to improve the volumetric efficiency of intake air. The intake device can include a variable intake pipe length device capable of varying the length of an intake pipe to obtain the above effects in a wide range of engine speeds.

Conventionally known is a vehicle including a variable intake pipe length device such that a plurality of movable funnels for a plurality of cylinders are connected and driven by a single actuator and a link mechanism (see Japanese Patent Laid-open No. 2007-218243, for example).

In Japanese Patent Laid-open No. 2007-218243, a throttle body is connected to a cylinder head of an engine, and a cleaner box is connected to the throttle body.

The cleaner box contains a fixed funnel connected to the throttle body, a movable funnel adapted to be connected to or separated from the fixed funnel, and a funnel moving mechanism for moving the movable funnel. A motor as a drive source for the funnel moving mechanism is provided so as to project out of the cleaner box.

The funnel moving mechanism includes a support column mounted on the fixed funnel, a parallel link pivotably mounted through two pivot shafts to the support column, a moving member and moving shaft connected to the parallel link, and a rotation lever connected to the moving shaft and mounted on an output shaft of the motor.

When the output shaft of the motor is rotated, the moving member and the moving shaft are moved to swing the parallel link about the two pivot shafts. As a result, the movable funnel is connected to the fixed funnel to obtain a long intake pipe length corresponding to a low engine speed. Conversely, the movable funnel is separated from the fixed funnel to obtain a short intake pipe length corresponding to a high engine speed.

The motor is large in size and therefore projects out of the cleaner box to occupy a large space. Further, the funnel moving mechanism connects the movable funnels for the four cylinders and it is composed of many parts, causing a large size and largely projecting before the movable funnels. Thus, the layout of peripheral parts provided around the motor and the funnel moving mechanism is limited.

SUMMARY OF THE INVENTION

It is accordingly an object of the present invention to provide a variable intake pipe length device which can be reduced in size and improved in flexibility of layout of peripheral parts.

In accordance with a first aspect of the invention, there is provided a vehicle including a variable intake pipe length device capable of adjusting the length of an intake pipe according to the condition of an engine, the intake pipe being provided in an intake passage for inducing air from an air cleaner box to an intake port of the engine, the intake pipe including a fixed funnel and a movable funnel movable relative to the fixed funnel by a driving force of an actuator. The actuator for moving the movable funnel is located inside of an envelope formed by the contour of the intake pipe.

Accordingly, the variable intake pipe length device can be reduced in size, and peripheral parts provided around the variable intake pipe length device are less limited by the variable intake pipe length device, so that the flexibility of the layout of the peripheral parts can be increased.

In accordance with a second aspect of the invention, there is provided a vehicle including a variable intake pipe length device capable of adjusting the length of an intake pipe according to the condition of an engine, the intake pipe being provided in an intake passage for inducing air from an air cleaner box to an intake port of the engine, the intake pipe including a fixed funnel and a movable funnel movable relative to the fixed funnel by a driving force of an actuator. The axis of the actuator for moving the movable funnel is located inside of an envelope formed by the contour of the intake pipe.

Accordingly, the amount of projection of the actuator from the contour of the intake pipe can be suppressed. As a result, the variable intake pipe length device can be reduced in size, and peripheral parts provided around the variable intake pipe length device are less limited by the variable intake pipe length device, so that the flexibility of the layout of the peripheral parts can be increased.

In accordance with a third aspect of the invention, the actuator includes a drive source for generating a rotational force, and the axis of the actuator as an axis of rotation extends parallel to the axis of the intake pipe.

Accordingly, the actuator can be located closer to the intake pipe, so that the size of the variable intake pipe length device can be reduced.

In accordance with a fourth aspect of the invention, the actuator is provided inside of the air cleaner box.

The actuator can be cooled by an air flow in the air cleaner box.

In accordance with a fifth aspect of the invention, a rotating pipe as a rotating member to be rotationally driven by the actuator is included in the intake pipe, and the movable funnel is moved in the axial direction of the intake pipe by the rotation of the rotating pipe to thereby vary the length of the intake pipe.

The movable funnel is moved by rotating the rotating pipe of the intake pipe. Accordingly, the number of parts of a driving mechanism for driving the movable funnel can be reduced. Further, the rotating pipe is included in the intake pipe. That is, the rotating pipe does not project outside the intake pipe, so that the size of the variable intake pipe length device can be reduced.

In accordance with a sixth aspect of the invention, the actuator includes an ultrasonic motor, and the rotor of the ultrasonic motor is the rotating pipe.

The actuator functions as a vibration source of ultrasonic vibration. When ultrasonic vibration is generated by the actuator, the rotating pipe kept in pressure contact with the actuator is rotated. Thus, the rotor of the actuator is the rotating pipe as a part of the intake pipe. Accordingly, the number of parts of the driving mechanism for the movable funnel can be further reduced, so that the size of the variable intake pipe length device can be further reduced.

In accordance with a seventh aspect of the invention, an actuator is provided for each cylinder of the engine.

Accordingly, an optimum intake pipe length can be set for each cylinder.

In accordance with an eighth aspect of the invention, the engine is a straight four-cylinder engine, and the actuators for the first and fourth cylinders are simultaneously operated, and the actuators for the second and third cylinders are simultaneously operated.

In the case that the strokes of a combustion cycle in the first and fourth cylinders located near the opposite ends of a crankshaft are the same as each other, and the combustion cycle strokes in the second and third cylinders located between the first and fourth cylinders are the same as each other, the actuators for the two cylinders whose combustion cycle strokes are the same as each other are simultaneously operated, thereby further improving the intake efficiency of the engine.

In accordance with a ninth aspect of the invention, the engine is a V-type four-cylinder engine, and the actuators for the two cylinders in one of the banks are simultaneously operated, and the actuators for the two cylinders in the other bank are simultaneously operated.

In the case that the combustion cycle strokes in the two cylinders in one of the banks are the same as each other, and the combustion cycle strokes in the two cylinders in the other bank are the same as each other, the actuators for the two cylinders whose combustion cycle strokes are the same as each other are simultaneously operated, thereby further improving the intake efficiency of the engine.

According to the first aspect of the invention, the actuator is located inside of the envelope formed by the contour of the intake pipe. Accordingly, the variable intake pipe length device can be reduced in size, and the flexibility of the layout of the peripheral parts provided around the intake pipe can be increased.

According to the second aspect of the invention, the axis of the actuator is located inside of the envelope formed by the contour of the intake pipe. Accordingly, the variable intake pipe length device can be reduced in size, and the flexibility of the layout of the peripheral parts provided around the intake pipe can be increased.

According to the third aspect of the invention, the actuator includes a drive source for generating a rotational force, and the axis of the actuator as an axis of rotation extends parallel to the axis of the intake pipe. Accordingly, the actuator can be located closer to the intake pipe, so that the size of the variable intake pipe length device can be reduced.

According to the fourth aspect of the invention, the actuator is provided inside of the air cleaner box. Accordingly, the actuator can be isolated from the engine, so that it is not necessary for the actuator to take any measures for preventing heat radiation from the engine.

Further, the actuator can be cooled by an air flow in the air cleaner box. Accordingly, no special cooling device or structure is needed for the actuator, so that the cost can be suppressed.

According to the fifth aspect of the invention, the rotating member to be rotationally driven by the actuator is the rotating pipe included in the intake pipe. By the rotation of the rotating pipe, the movable funnel is moved in the axial direction of the intake pipe to thereby vary the length of the intake pipe. If the movable funnel is driven by a link mechanism, for example, the link mechanism may largely project from the intake pipe and the number of parts may also be increased. To the contrary, according to the fifth aspect of the invention, the movable funnel is driven by rotating the rotating pipe of the intake pipe. Accordingly, an increase in number of parts can be suppressed, and the size of the variable intake pipe length device can be reduced.

According to the sixth aspect of the invention, the actuator is provided by an ultrasonic motor, and the rotor of the ultrasonic motor is the rotating pipe. Accordingly, the number of parts can be reduced and the size of the variable intake pipe length device can be reduced.

According to the seventh aspect of the invention, an actuator is provided for each cylinder of the engine, so that the length of the intake pipe can be adjusted to an optimum pipe length for each cylinder. Accordingly, the lengths of exhaust pipes can be set individually for each cylinder, thereby increasing the flexibility of the layout of the exhaust pipes.

According to the eighth aspect of the invention, the engine is a straight four-cylinder engine, the actuators for the first and fourth cylinders are simultaneously operated, and the actuators for the second and third cylinders are simultaneously operated. Accordingly, control of the optimum intake pipe lengths in the straight four-cylinder engine can be performed.

According to the ninth aspect of the invention, the engine is a V-type four-cylinder engine, the two actuators for the two cylinders in one of the banks are simultaneously operated and the two actuators for the two cylinders in the other bank are simultaneously operated. Accordingly, control of the optimum intake pipe lengths in the V-type four-cylinder engine can be performed.

DETAILED DESCRIPTION OF THE INVENTION

The advantages of the invention will become apparent in the following description taken in conjunction with the drawings, wherein.

Figure 8A:
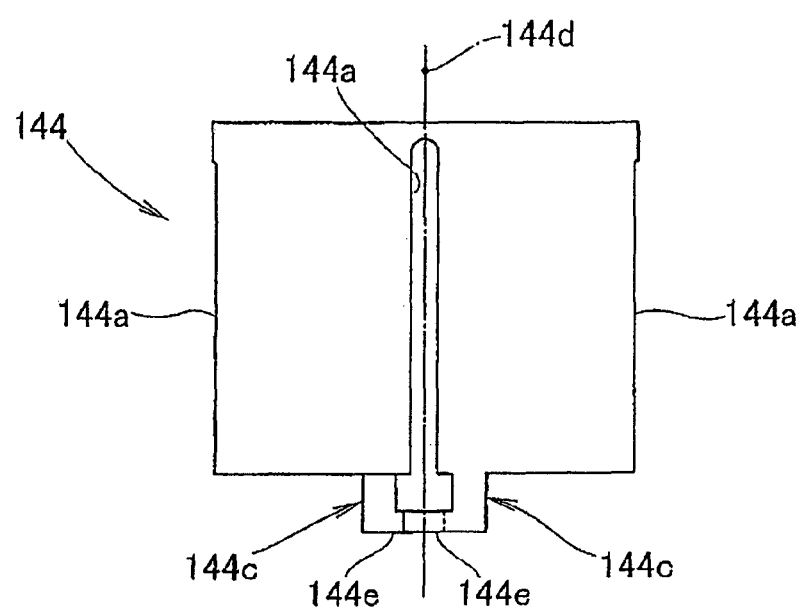
Figure 8B:
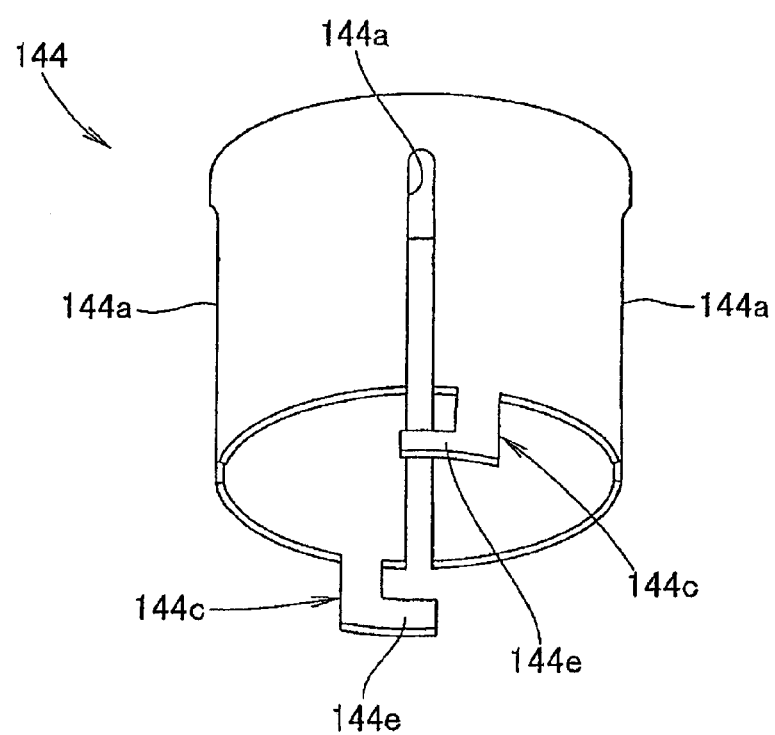
Figure 9:
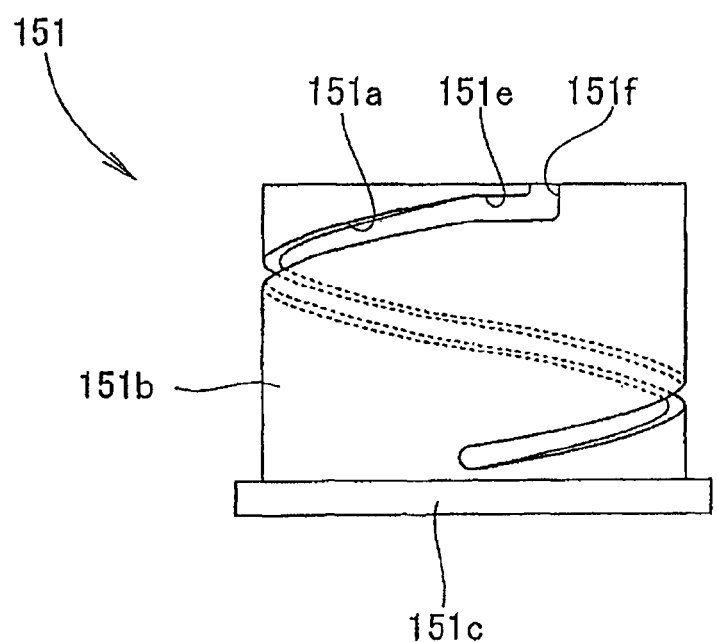
Figure 10:
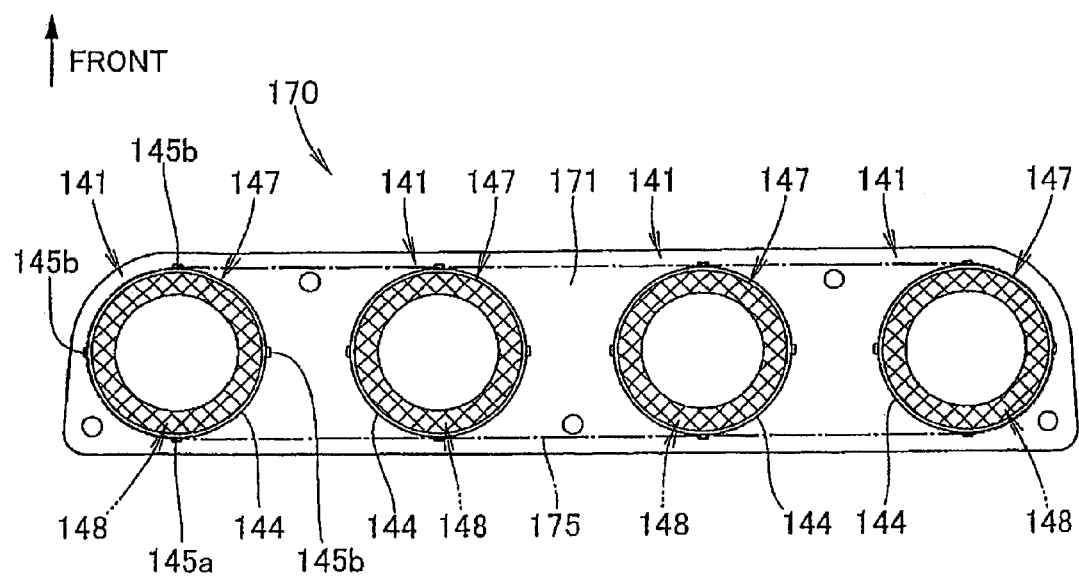
Figure 11:
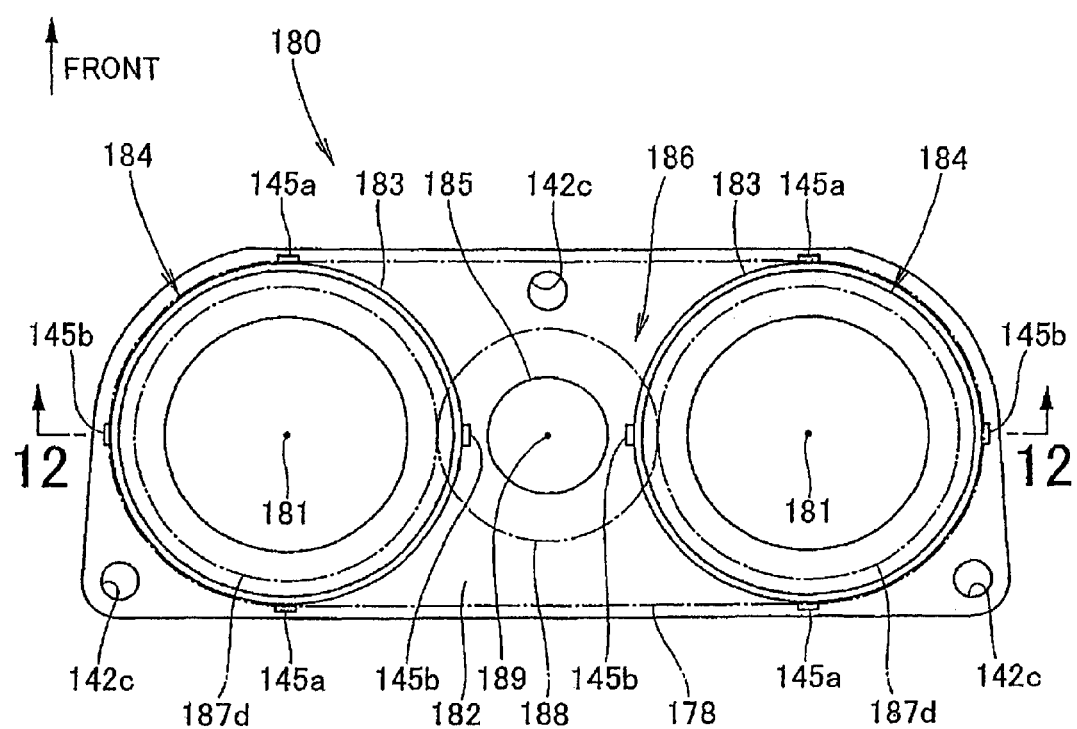
Figure 12:
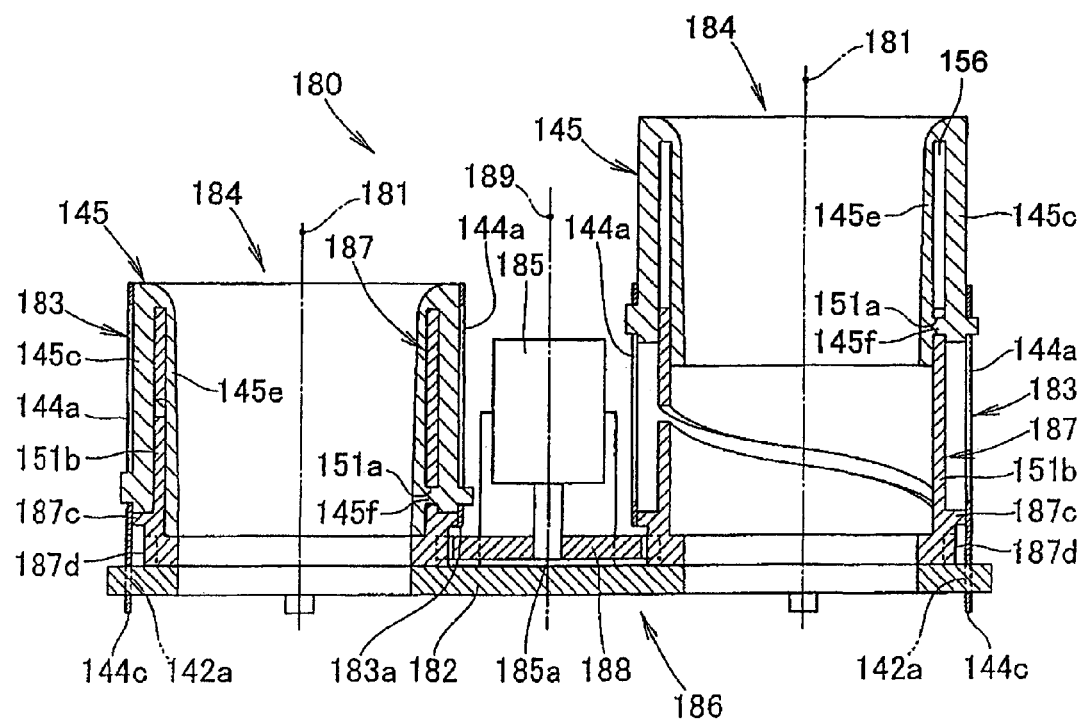
Figure 13:
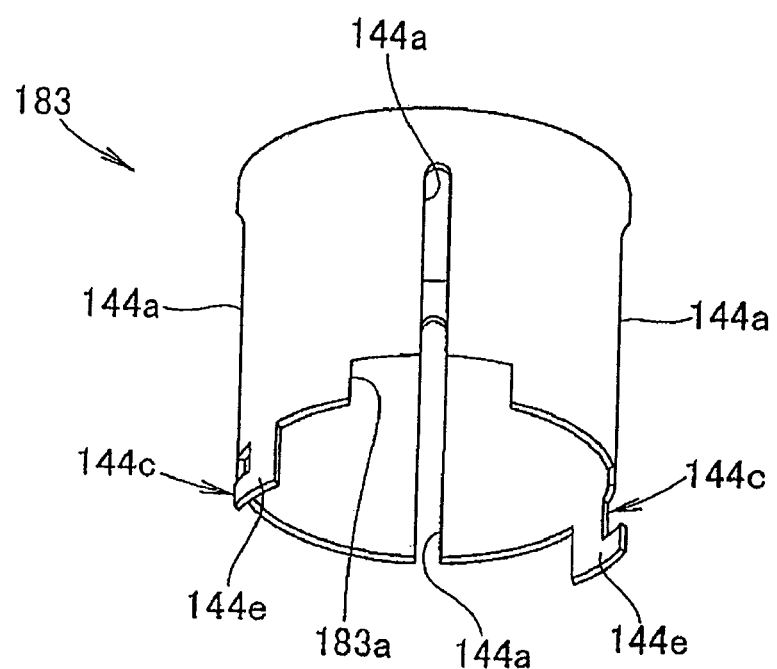
Figure 14:
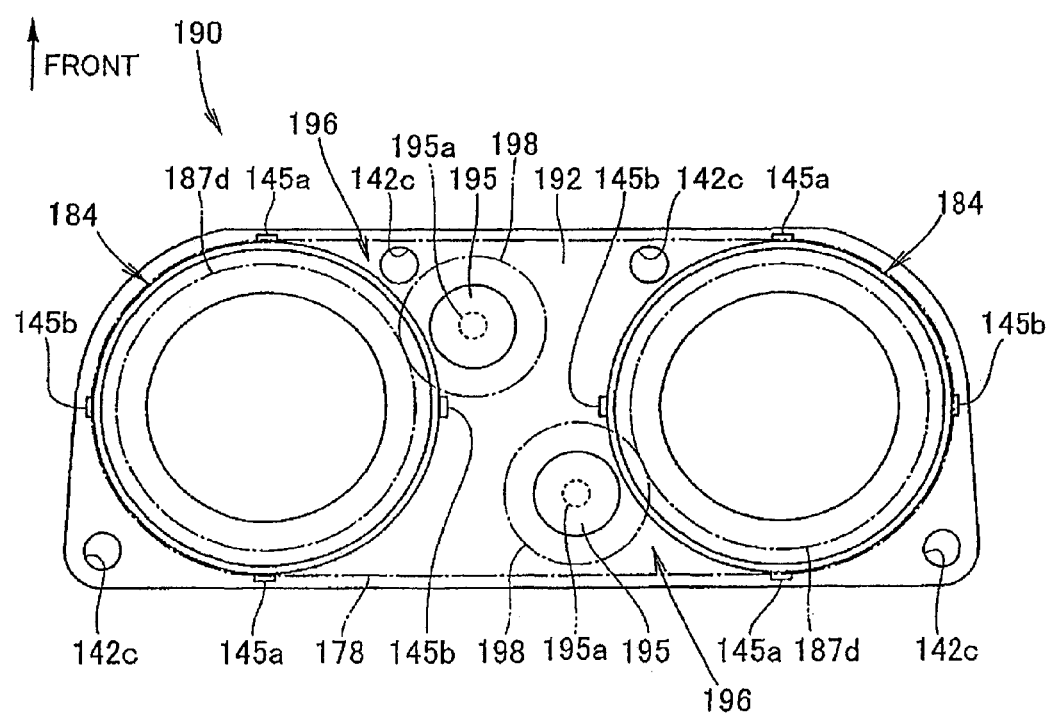
Figure 15:
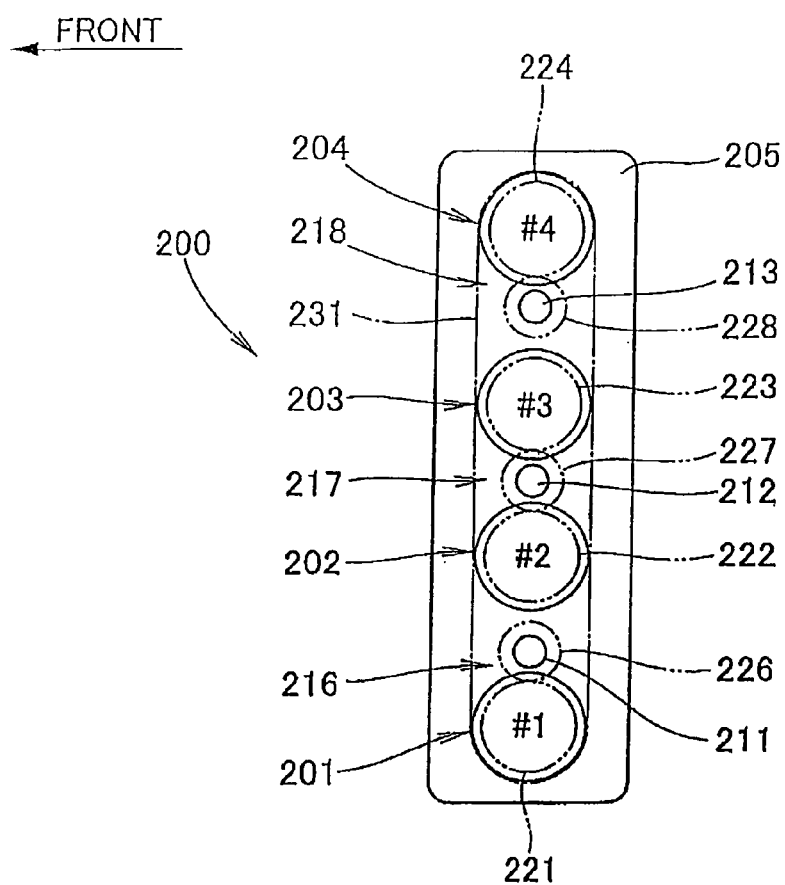
Figure 16:
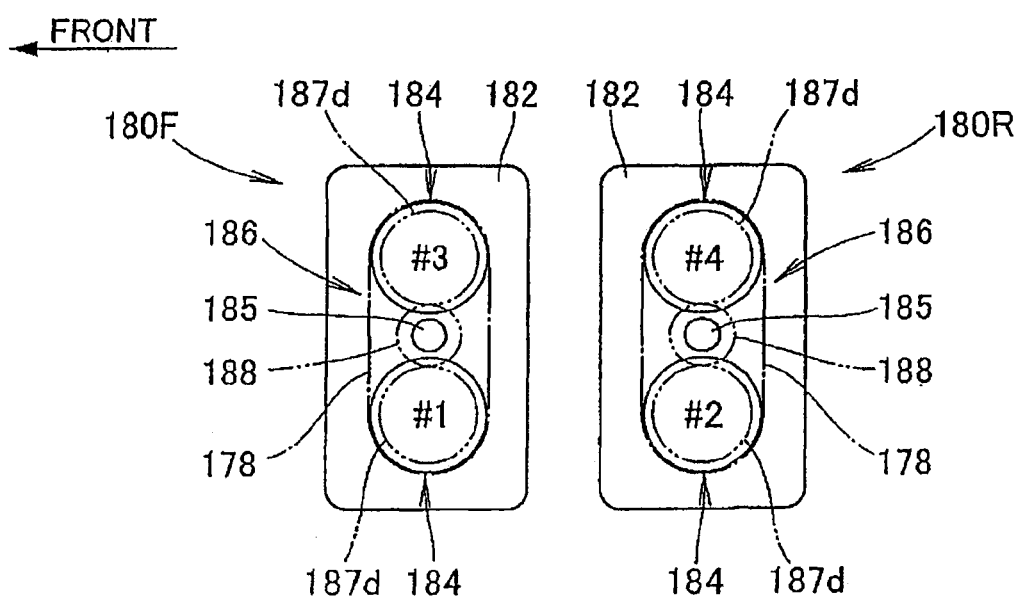

FIG. 8(a) and FIG. 8(b) are side and perspective views of a fixed funnel according to the first preferred embodiment;

FIG. 9 is a side view of a rotating pipe according to the first preferred embodiment;

FIG. 10 is a plan view of a variable intake pipe length device according to a second preferred embodiment of the present invention;

FIG. 11 is a plan view of a variable intake pipe length device according to a third preferred embodiment of the present invention;

FIG. 12 is a cross section taken along the line 12-12 in FIG. 11;

FIG. 13 is a perspective view of a fixed funnel according to the third preferred embodiment;

FIG. 14 is a plan view of a variable intake pipe length device according to a fourth preferred embodiment of the present invention;

FIG. 15 is a schematic plan view of a variable intake pipe length device according to a fifth preferred embodiment of the present invention; and FIG. 16 is a schematic plan view of variable intake pipe length devices according to a sixth preferred embodiment of the present invention.

Some preferred embodiments of the present invention will now be described with reference to the drawings. The orientation of each drawing is the same as that of the reference numerals included therein.

Figure 1:
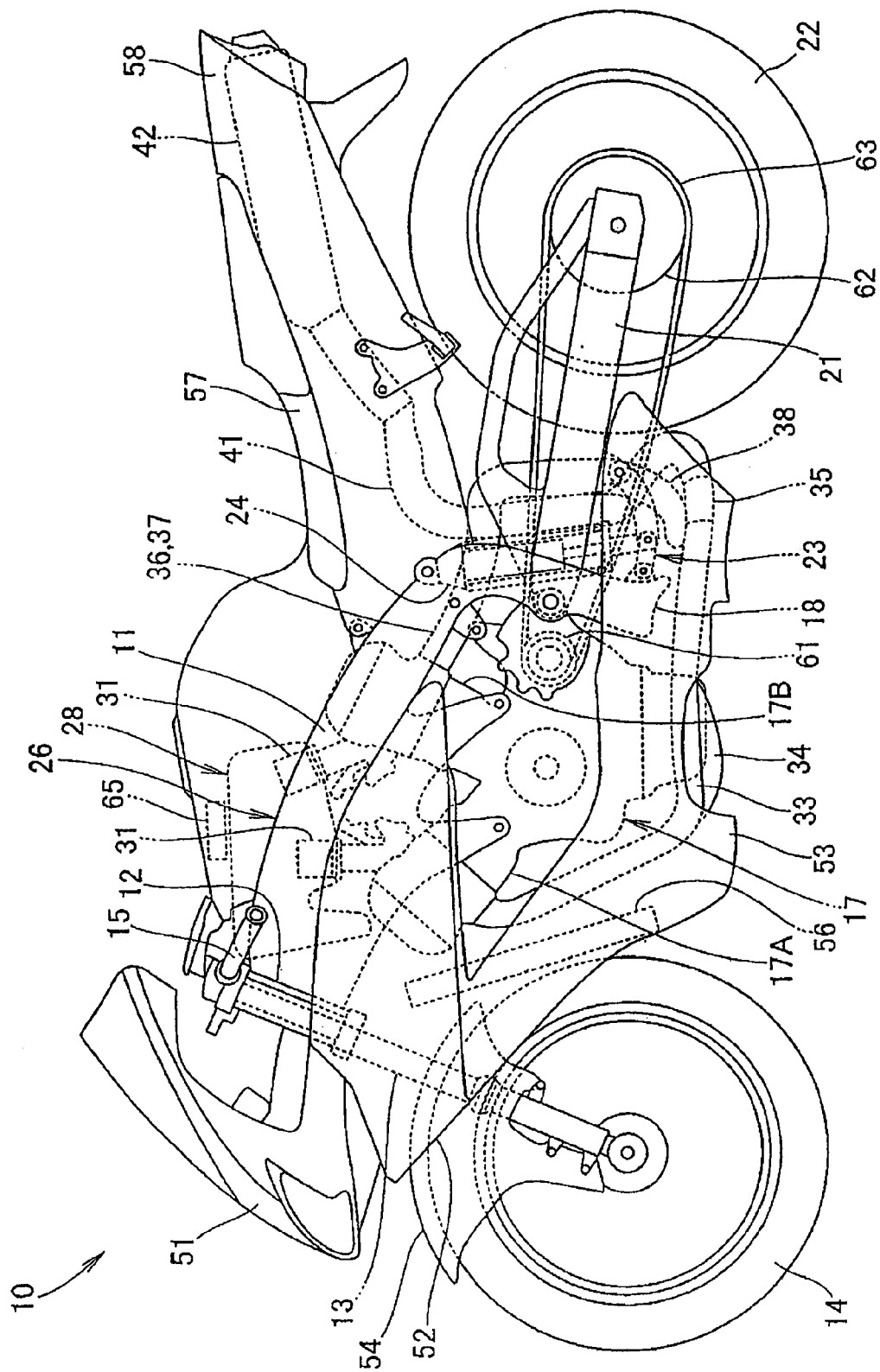
FIG. 1 is a side view of a vehicle to which a first preferred embodiment of the present invention is applied.

FIG. 1 is a side view of a vehicle 10 to which a first preferred embodiment of the present invention is applied. The vehicle 10 is a motorcycle having a main frame 11, a head pipe 12 provided at the front end of the main frame 11, a front fork 13 steerably mounted to the head pipe 12, a front wheel 14 mounted to the lower end portion of the front fork 13, a pair of left and right handles 15 and 16 (only the left handle 15 being shown) mounted to the upper end of the front fork 13, an engine 17 mounted to the lower portion of the main frame 11, a pivot plate 18 formed integrally with the main frame 11 at its rear portion, a swing arm 21 vertically swingably mounted to the pivot plate 18, a rear wheel 22 mounted to the rear end portion of the swing arm 21, a link mechanism 23 connected between the lower portion of the swing arm 21 and the pivot plate 18, and a rear cushion unit 24 connected between the link mechanism 23 and the rear upper portion of the main frame 11.

The main frame 11, the head pipe 12, and the pivot plate 18 constitute a body frame 26.

The engine 17 is, for example, a V-type four-cylinder engine having a front cylinder 17A and a rear cylinder 17B. An intake device 28 is connected to the front cylinder 17A and the rear cylinder 17B. The intake device 28 includes a pair of front and rear variable intake pipe length devices 31 respectively connected to the front and rear cylinders 17A and 17B. Two exhaust pipes 33 and 34 are connected to the front cylinder 17A so as to extend therefrom obliquely downward and horizontally rearward. These exhaust pipes 33 and 34 are joined together at a manifold portion 35. Similarly, two exhaust pipes 36 and 37 are connected to the rear cylinder 17B so as to extend therefrom obliquely downward and vertically downward. These exhaust pipes 36 and 37 are joined together at a manifold portion 38. Further, a rear exhaust pipe 41 is connected to the manifold portions 35 and 38 so as to extend therefrom vertically upward and obliquely upward. A muffler 42 is connected to the rear exhaust pipe 41.

The vehicle 10 further has a front cowl 51, middle cowl 52, lower cowl 53, front fender 54, radiator 56, seat 57, rear cowl 58, drive sprocket 61, driven sprocket 62, chain 63, and engine control unit 65.

Figure 2:
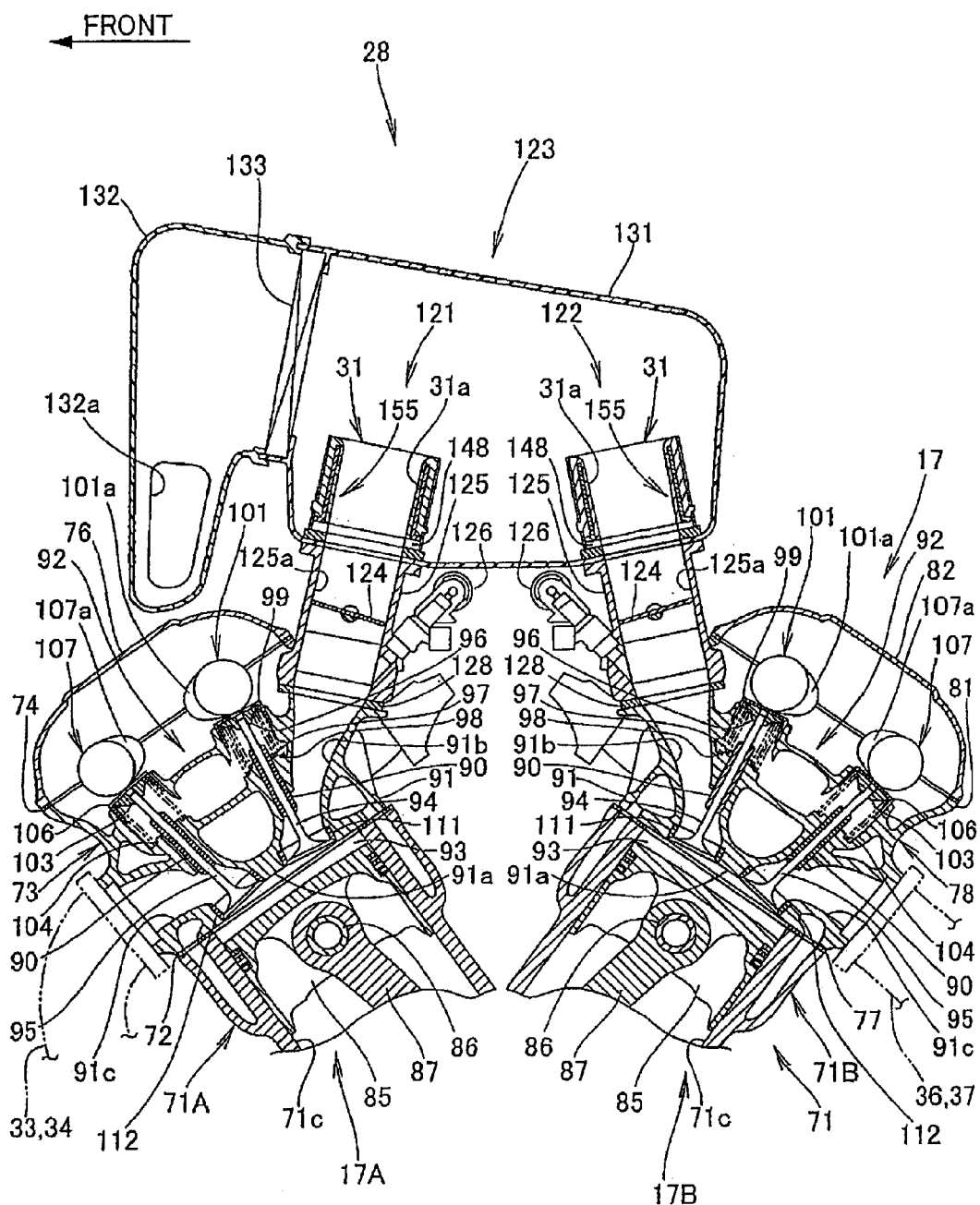
FIG. 2 is a sectional view showing an essential part of an engine and an intake device according to the first preferred embodiment.

FIG. 2 is a sectional view showing an essential part of the engine 17 and the intake device 28 according to the first preferred embodiment.

In FIG. 2, the arrow shown by "FRONT" represents the front side of the vehicle 10.

The engine 17 has a cylinder block 71. The cylinder block 71 is formed at its upper portion with a front cylinder portion 71A and a rear cylinder portion 71B. A front cylinder head 73 is mounted on the front cylinder portion 71A through a head gasket 72, and a front head cover 76 is mounted on the front cylinder head 73 through a head cover gasket 74. Similarly, a rear cylinder head 78 is mounted on the rear cylinder portion 71B through a head gasket 77, and a rear head cover 82 is mounted on the rear cylinder head 78 through a head cover gasket 81.

The front cylinder portion 71A is formed with two cylinder bores 71c. A piston 85 is movably fitted in each cylinder bore 71c, and a connecting rod 87 is connected through a piston pin 86 to the piston 85.

Similarly, the rear cylinder portion 71B is formed with two cylinder bores 71c. A piston 85 is movably fitted in each cylinder bore 71c, and a connecting rod 87 is connected through a piston pin 86 to the piston 85.

The front cylinder 17A includes the front cylinder portion 71A, the two pistons 85, the two piston pins 86, the two connecting rods 87, the head gasket 72, the front cylinder head 73, the head cover gasket 74, and the front head cover 76.

Similarly, the rear cylinder 17B includes the rear cylinder portion 71B, the two pistons 85, the two piston pins 86, the two connecting rods 87, the head gasket 77, the rear cylinder head 78, the head cover gasket 81, and the rear head cover 82.

Thus, the front cylinder 17A and the rear cylinder 17B have the same basic structure, so only the front cylinder 17A will now be described.

The front cylinder head 73 is composed of a cylinder head body 91 and a valve operating mechanism 92 mounted to the cylinder head body 91.

The cylinder head body 91 is formed with a recess 91a, an intake port 91b extending from the recess 91a to the rear surface of the cylinder head body 91, and an exhaust port 91c extending from the recess 91a to the front surface of the cylinder head body 91. A combustion chamber 93 is formed by the cylinder bore 71c, the piston 85, and the recess 91a.

The valve operating mechanism 92 includes an intake valve 94 movably mounted through a valve guide 90 to the cylinder head body 91 for operatively closing an opening of the intake port 91b exposed to the combustion chamber 93, an exhaust valve 95 movably mounted through a valve guide 90 to the cylinder head body 91 for operatively closing an opening of the exhaust port 91c exposed to the combustion chamber 93, a retainer 96 mounted at the upper end of the intake valve 94, a pair of valve springs 97 and 98 provided between the retainer 96 and the cylinder head body 91 for biasing the intake valve 94 in a valve closing direction, a valve lifter 99 slidably fitted in the cylinder head body 91 so as to cover the upper end of the intake valve 94, the retainer 96, and the upper ends of the valve springs 97 and 98, a camshaft 101 having a cam 101a kept in direct contact with the valve lifter 99 for pushing down the valve lifter 99 to open the intake valve 94, a retainer 103 mounted at the upper end of the exhaust valve 95, a valve spring 104 provided between the retainer 103 and the cylinder head body 91 for biasing the exhaust valve 95 in a valve closing direction, a valve lifter 106 slidably fitted in the cylinder head body 91 so as to cover the upper end of the exhaust valve 95, the retainer 103, and the upper end of the valve spring 104, and a camshaft 107 having a cam 107a kept in direct contact with the valve lifter 106 for pushing down the valve lifter 106 to open the exhaust valve 95. Further, a valve seat 111 is provided at the opening of the intake port 91b exposed to the combustion chamber 93, and a valve seat 112 is provided at the opening of the exhaust port 91c exposed to the combustion chamber 93.

The intake device 28 includes a front intake passage portion 121 mounted to the front cylinder head 73, a rear intake passage portion 122 mounted to the rear cylinder head 78, and an air cleaner box 123 mounted to the front intake passage portion 121 and the rear intake passage portion 122.

The front intake passage portion 121 is composed of a throttle body 125 having two air passages 125a respectively straight communicating with the two intake ports 91b of the front cylinder head 73, two fuel injection valves 126 mounted to the rear side surface of the throttle body 125 for injecting fuel into the two intake ports 91b, and the front variable intake pipe length device 31 mounted to the throttle body 125 in such a manner that two air passages 31a of the front variable intake pipe length device 31 are respectively aligned to the two air passages 125a of the throttle body 125. A throttle valve 124 is provided in each air passage 125a of the throttle body 125. A sealing gasket 128 is provided between the cylinder head body 91 and the throttle body 125.

The basic structure of the rear intake passage portion 122 is the same as that of the front intake passage portion 121, so the detailed description of the rear intake passage portion 122 will be omitted herein.

The air cleaner box 123 is composed of an air cleaner body 131, an air cleaner cover 132 for closing a front opening of the air cleaner body 131, and an air cleaner element 133 fixed between the air cleaner body 131 and the air cleaner cover 132 in the vicinity of the front opening of the air cleaner body 131. The air cleaner box 123 is fixed between the throttle bodies 125 for the front and rear cylinders 17A and 17B and the variable intake pipe length devices 31 for the front and rear cylinders 17A and 17B. The air cleaner cover 132 is formed with an intake opening 132a.

Figure 3:
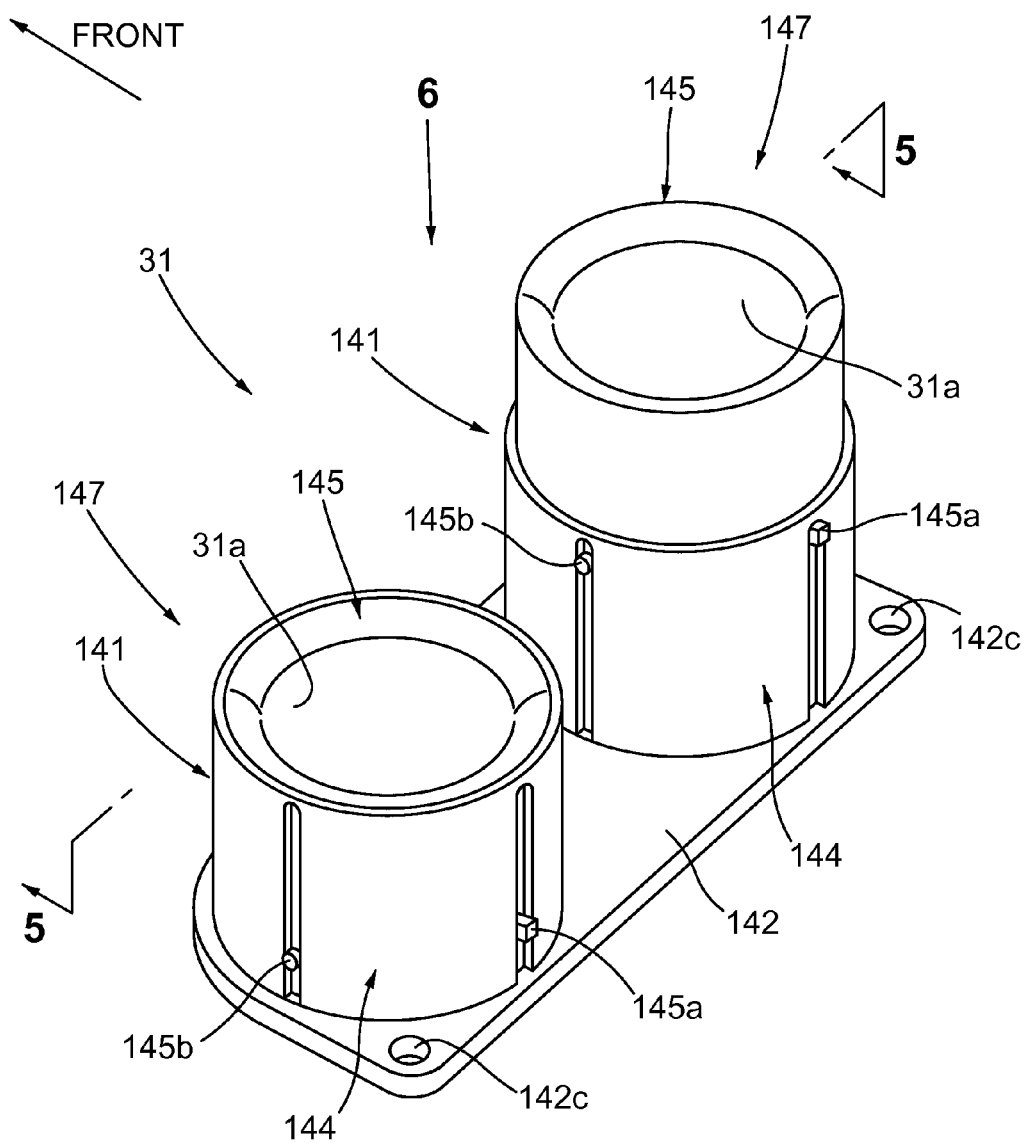
FIG. 3 is a perspective view of a variable intake pipe length device according to the first preferred embodiment.

FIG. 3 is a perspective view of the front variable intake pipe length device 31 according to the first preferred embodiment. The variable intake pipe length device 31 shown in FIG. 3 is composed of two variable-length air funnels 141 respectively provided for the two cylinders in the front cylinder 17A (see FIG. 2) and a base plate 142 for supporting the two variable-length air funnels 141. Each variable-length air funnel 141 includes a fixed funnel 144 mounted to the base plate 142 and a movable funnel 145 movably inserted in the fixed funnel 144.

As shown in FIG. 3, the left variable-length air funnel 141 is in a short condition where the movable funnel 145 is fully inserted in the fixed funnel 144, and the right variable-length air funnel 141 is in a long condition where the movable funnel 145 is fully projected upward from the fixed funnel 144. However, these different conditions of the right and left variable-length air funnels 141 are shown for the purpose of illustration, and these two variable-length air funnels 141 normally have the same condition according to the condition of the engine 17. More specifically, when the engine speed is lower than a predetermined speed, both the two variable-length air funnels 141 have the long condition, whereas when the engine speed is higher than or equal to the predetermined speed, both the two variable-length air funnels 141 have the short condition.

Figure 4:
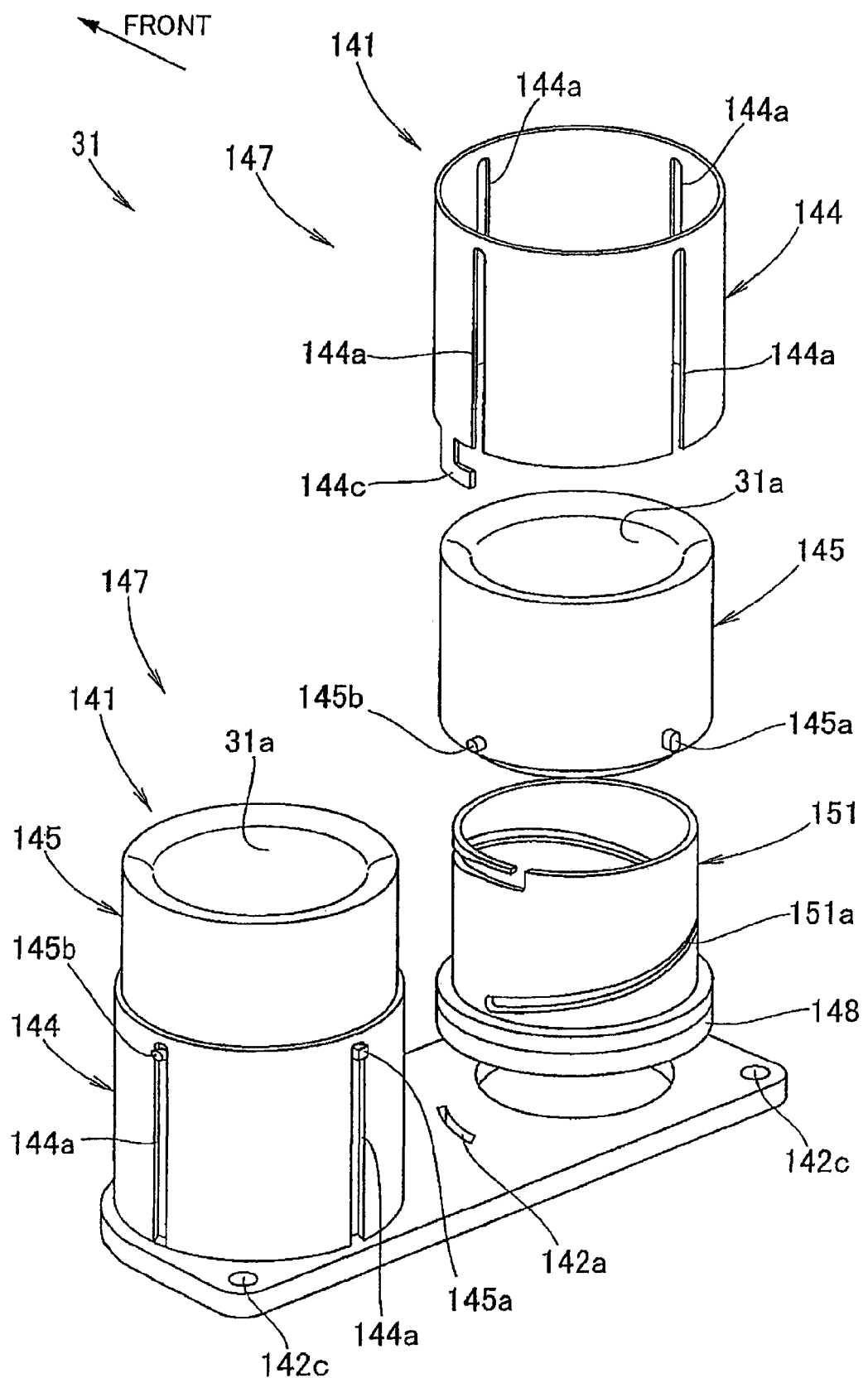
FIG. 4 is a partially exploded perspective view of the variable intake pipe length device shown in FIG. 3.

FIG. 4 is an exploded perspective view of the variable intake pipe length device 31 shown in FIG. 3, wherein the right variable-length air funnel 141 is exploded. Each variable-length air funnel 141 includes the fixed funnel 144, the movable funnel 145, a rotating pipe 151 rotatably inserted in the movable funnel 145, and an actuator 148 for rotating the rotating pipe 151.

The fixed funnel 144 is formed with four vertical slits 144a and two L-shaped mounting hooks 144c (one of which being shown in FIG. 4) extending from the lower end of the fixed funnel 144.

The movable funnel 145 is formed with four projections 145a and 145b (two of which being shown in FIG. 4) projecting from the outer circumferential surface of the movable funnel 145.

The rotating pipe 151 is formed with a spiral slit 151a.

Figure 5:
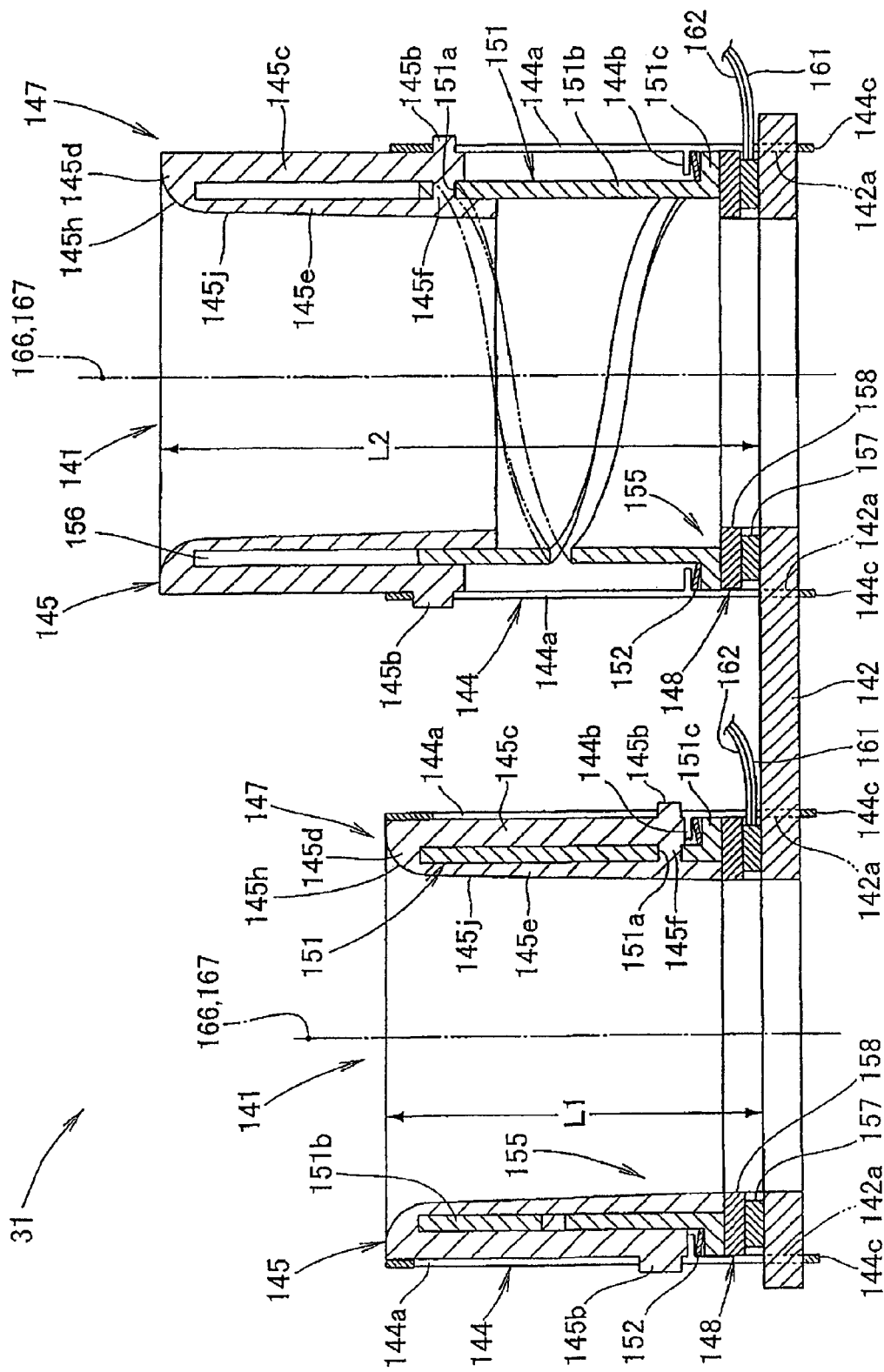
FIG. 5 is a cross section taken along the line 5-5 in FIG. 3.

FIG. 5 is a cross section taken along the line 5-5 in FIG. 3, wherein the left variable-length air funnel 141 is in the short condition and the right variable-length air funnel 141 is in the long condition.

As shown in FIG. 5, each variable-length air funnel 141 includes the fixed funnel 144, the movable funnel 145, the rotating pipe 151 for moving the movable funnel 145, the ringlike actuator 148 mounted on the base plate 142 for rotating the rotating pipe 151, and a disc spring 152 for pressing the rotating pipe 151 against the actuator 148.

In each variable-length air funnel 141, the fixed funnel 144, the movable funnel 145, and the rotating pipe 151 constitute an intake pipe 147.

The length (intake pipe length) of the left intake pipe 147 in the short condition is shown by L1, and the length (intake pipe length) of the right intake pipe 147 in the long condition is shown by L2.

The fixed funnel 144 is a cylindrical member, which is formed with the four vertical slits 144a extending axially, an inward projecting wall 144b projecting inward from the inner surface, and the two L-shaped mounting hooks 144c inserted through and engaged with two arcuate slits 142a formed through the base plate 142.

The movable funnel 145 is composed of an outer cylinder 145c, an inner cylinder 145e, an annular upper connecting portion 145d for integrally connecting the upper ends of the outer cylinder 145c and the inner cylinder 145e, and a pinlike connecting portion 145f for integrally connecting the lower end portions of the outer cylinder 145c and the inner cylinder 145e. The four projections 145a and 145b (only the two projections 145b being shown in FIG. 5, the other two projections 145a being shown in FIGS. 3 and 4) are formed on the outer circumferential surface of the outer cylinder 145c so as to be inserted through the four vertical slits 144a of the fixed funnel 144 and guided along the vertical slits 144a.

The upper connecting portion 145d has an arcuate surface 145h, and the inner cylinder 145e has a tapering inner surface 145j continuing to the arcuate surface 145h of the upper connecting portion 145d. The tapering inner surface 145j of the inner cylinder 145e is tapered downward in such a manner that the inner diameter of the inner cylinder 145e is gradually decreased toward its lower end. With this structure, the flow velocity of intake air can be increased.

The rotating pipe 151 is composed of a cylindrical portion 151b inserted in a space 156 defined between the outer cylinder 145c and the inner cylinder 145e of the movable funnel 145 so as to be projectable from the space 156, and a flange portion 151c formed integrally with the cylindrical portion 151b at its lower end. The flange portion 151c is pressed against the actuator 148 by the coned disc spring 152. The cylindrical portion 151b is formed with the spiral slit 151a for guiding the pin-like connecting portion 145f of the movable funnel 145.

The actuator 148 is provided by an ultrasonic motor 155, and the rotating pipe 151 as a part of the intake pipe 147 functions as the rotor of the ultrasonic motor 155.

The actuator 148 is composed of a piezoelectric ceramic 157 as a source of ultrasonic vibration and a mechanical vibrator 158 to be vibrated by the piezoelectric ceramic 157. The natural frequency of the mechanical vibrator 158 falls in an ultrasonic region (not less than 20 kHz). Conductors 161 and 162 are connected to the piezoelectric ceramic 157.

The actuator 148 has an axis 166, and the rotating pipe 151 has an axis 167 as an axis of rotation, which coincides with the axis of intake pipe 147. The actuator 148 is located so that its axis 166 coincides with the axis 167 of the rotating pipe 151.

When the mechanical vibrator 158 is vibrated, the upper surface of the mechanical vibrator 158 undulates in the circumferential direction to generate a traveling wave. A point on the traveling wave (a point on the upper surface of the mechanical vibrator 158) makes an elliptical motion along a plane perpendicular to the upper surface of the mechanical vibrator 158. Accordingly, when this point is moved in the circumferential direction of the mechanical vibrator 158, a point on the lower surface of the flange portion 151c of the rotating pipe 151 pressed against the mechanical vibrator 158 is moved together in contact with the point on the upper surface of the mechanical vibrator 158. As a result, the flange portion 151c is rotated, i.e., the rotating pipe 151 is rotated.

When the rotating pipe 151 is rotated, the spiral slit 151a is also rotated. Since the pinlike connecting portion 145f of the movable funnel 145 is inserted through the spiral slit 151a, the movable funnel 145 is raised or lowered by the rotation of the spiral slit 151a and the four projections 145a and 145b of the movable funnel 145 are guided along the vertical slits 144a of the fixed funnel 144.

In each variable-length air funnel 141, the flange portion 151c of the rotating pipe 151 is pressed against the mechanical vibrator 158 of the actuator 148 by the disc spring 152. Accordingly, a frictional force can be generated between the mechanical vibrator 158 and the flange portion 151c, so that even when the actuator 148 is stopped in the raised condition of the movable funnel 145, it is possible to prevent a possibility that the rotating pipe 151 may spontaneously rotate to cause lowering of the movable funnel 145.

Figure 6:
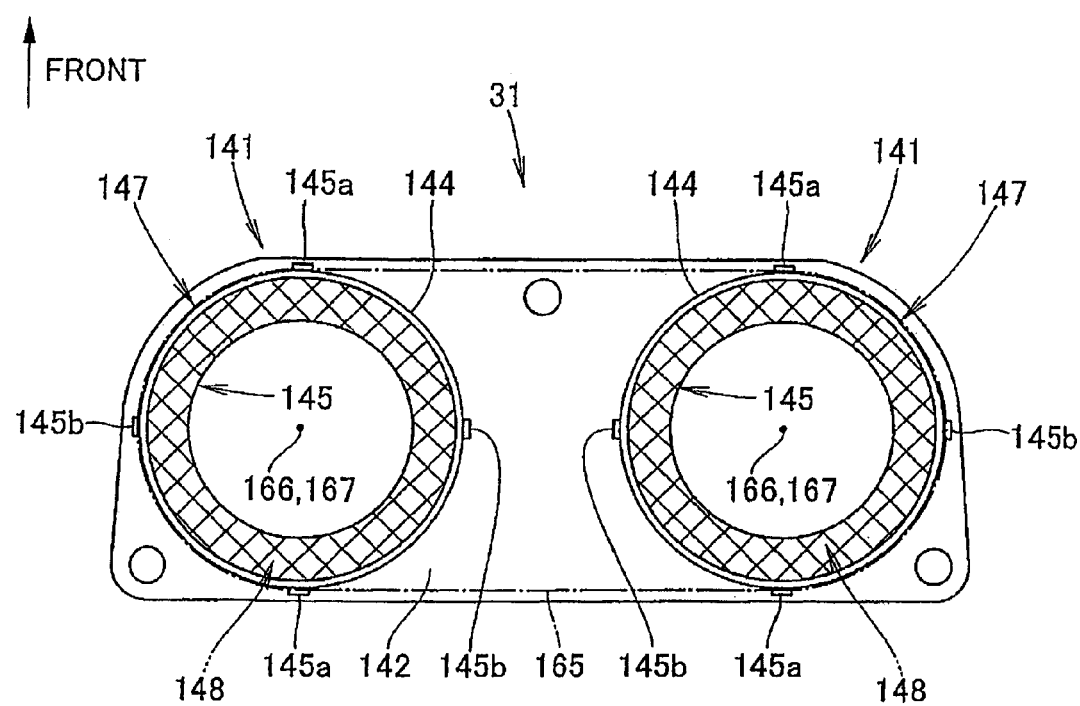
FIG. 6 is a view taken in the direction shown by an arrow 6 in FIG. 3.

FIG. 6 is a view taken in the direction shown by an arrow 6 in FIG. 3. As shown in FIG. 6, the two actuators 148 (crosshatched areas) are located inside of an envelope 165 (chain line forming an oval shape) formed by the contours of the two intake pipes 147, i.e., by the contours of the two fixed funnels 144.

Since the actuators 148 are located inside of the envelope 165 formed by the contours of the intake pipes 147, the variable-length air funnels 141 can be reduced in size. Accordingly, the variable intake pipe length device 31 can be reduced in size.

Referring back to FIG. 2, each actuator 148 (or each ultrasonic motor 155) is located within the longitudinal range of the corresponding intake pipe 147 as viewed in side elevation of the vehicle 10.

Figure 7:
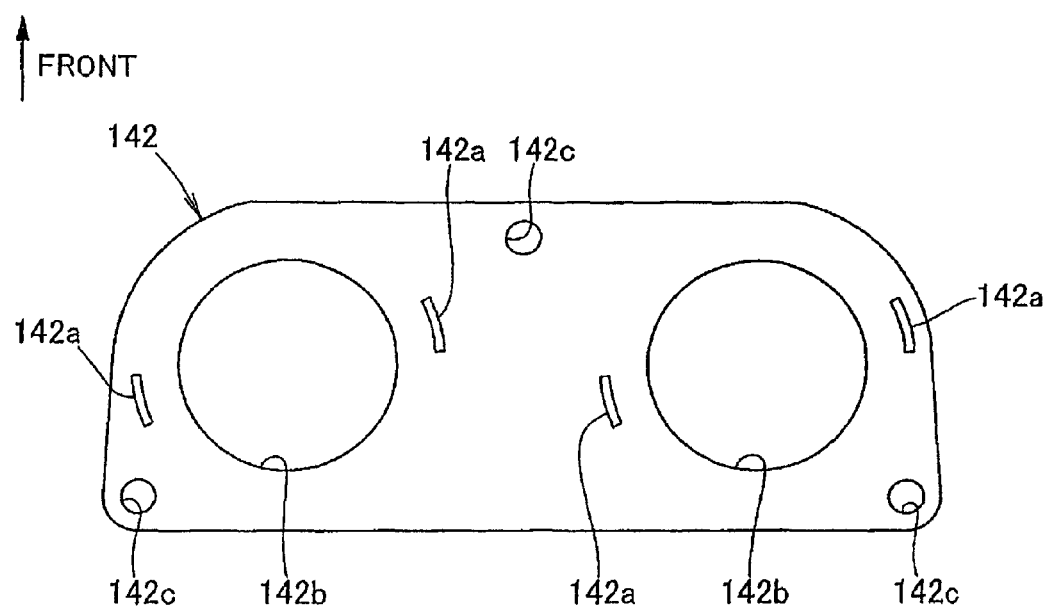
FIG. 7 is a plan view of a base plate according to the first preferred embodiment.

FIG. 7 is a plan view of the base plate 142. As shown in FIG. 7, the base plate 142 is formed with two through holes 142b as intake passages, two pairs of arcuate slits 142a respectively located about the two through holes 142b, and three bolt insertion holes 142c for insertion of bolts for mounting the base plate 142 (i.e., the variable intake pipe length device 31) to the corresponding throttle body 125 (see FIG. 2).

FIG. 8(a) is a side view of the fixed funnel 144, and FIG. 8(b) is a perspective view of the fixed funnel 144 as viewed from the lower side thereof.

As shown in FIG. 8(a), the fixed funnel 144 has an axis 144d, and each vertical slit 144a of the fixed funnel 144 extends parallel to the axis 144d. Each vertical slit 144a is open at its lower end for the purpose of insertion of the corresponding projection 145a (or 145b) of the movable funnel 145 (see FIG. 5).

The two L-shaped mounting hooks 144c are located so as to intersect the extensions from the lower ends of any two opposed ones of the four vertical slits 144a.

As shown in FIG. 8(b), the two L-shaped mounting hooks 144c of the fixed funnel 144 have horizontal portions 144e projecting in the same circumferential direction.

Accordingly, in mounting the fixed funnel 144 to the base plate 142 (see FIG. 7), the two L-shaped mounting hooks 144c are first inserted through the respective two arcuate slits 142a of the base plate 142 (see FIG. 7). Thereafter, the fixed funnel 144 is rotated clockwise as viewed in plan. Since the horizontal portions 144e of the two L-shaped mounting hooks 144c project in the same circumferential direction, the horizontal portions 144e are engaged with the lower surface of the base plate 142 at positions near the arcuate slits 142a, thereby preventing withdrawal of the fixed funnel 144 from the base plate 142.

FIG. 9 is a side view of the rotating pipe 151. As shown in FIG. 9, the spiral slit 151a of the rotating pipe 151 has one end (lower end) in the vicinity of the flange portion 151c and the other end (upper end) connected to a horizontal slit 151e extending in the circumferential direction of the cylindrical portion 151b. The horizontal slit 151e is connected to a vertical slit 151f extending in the axial direction of the rotating pipe 151. The vertical slit 151f is open at the upper end of the cylindrical portion 151b.

Thus, the horizontal slit 151e is formed so as to continue to the upper end of the spiral slit 151a. Accordingly, even when the actuator 148 is stopped in the raised condition of the movable funnel 145, it is possible to prevent a possibility that the movable funnel 145 projecting from the fixed funnel 144 may lower due to its own weight. Thus, the raised condition of the movable funnel 145 can be maintained in addition to the frictional force between the mechanical vibrator 158 and the flange portion 151c of the rotating pipe 151 under the pressure of the disc spring 152 as shown in FIG. 5. Accordingly, the length of the intake pipe 147 can be maintained at an optimum length. Further, lowering of the movable funnel 145 can be prevented easily and reliably by the horizontal slit 151e that is a simple structure.

The operation of the variable intake pipe length device 31 will now be described.

When starting the engine 17 shown in FIGS. 1 and 2, the engine 17 is in an idling condition or a near idling condition. That is, the rotational speed of the engine 17 is low. In such a low-speed condition of the engine 17, each intake pipe 147 in the variable intake pipe length device 31 is in the long condition where each movable funnel 145 is raised as shown in the right intake pipe 147 in FIG. 5, thereby increasing the volumetric efficiency of intake air at a low engine speed.

When the engine speed is increased to reach a predetermined speed (e.g., 4000 rpm), each intake pipe 147 changes to the short condition where each movable funnel 145 is lowered as shown in the left intake pipe 147 in FIG. 5, thereby increasing the volumetric efficiency of intake air at a high engine speed.

Such expansion and contraction of each intake pipe 147 is made by each actuator 148 that is controlled by the engine control unit 65 (see FIG. 1) as a control device according to an engine speed signal.

As described above with reference to FIGS. 2, 5, and 6, the vehicle 10 (see FIG. 1) includes the front and rear variable intake pipe length devices 31 capable of adjusting the lengths of the front and rear intake pipes 147 according to the condition of the engine 17, wherein the front and rear intake pipes 147 are respectively provided in the front and rear intake passages 121 and 122 for inducing air from the air cleaner box 123 to the front and rear intake ports 91b of the engine 17, and each intake pipe 147 includes the fixed funnel 144 and the movable funnel 145 which is movable by a driving force of the actuator 148. In this configuration, the actuator 148 for moving the movable funnel 145 in each intake pipe 147 is located inside of the envelope 165 formed by the contour of each intake pipe 147. Further, the axis 166 of the actuator 148 is located inside of the envelope 165. With this arrangement, each variable intake pipe length device 31 can be reduced in size and the flexibility of layout of peripheral parts provided around each intake pipe 147 can be increased.

The axis 166 of the actuator 148 as a drive source for generating a rotational force substantially coincides with (extends parallel to) the axis 167 of the intake pipe 147. That is, the axis 166 of the actuator 148 substantially coincides with (extends parallel to) the axis 167 of the rotating pipe 151 as an axis of rotation. Accordingly, the actuator 148 can be located closer to the intake pipe 147, thereby further reducing the size of the variable intake pipe length device 31.

The actuator 148 is provided inside of the air cleaner box 123. Accordingly, the actuator 148 can be isolated from the engine 17, so that it is not necessary for the actuator 148 to take any measures for preventing heat radiation from the engine 17.

Further, the actuator 148 can be cooled by an air flow in the air cleaner box 123. Accordingly, no special cooling device or structure is needed for the actuator 148, so that the cost can be suppressed.

A rotating member to be rotationally driven by the actuator 148 is the rotating pipe 151 included in the intake pipe 147. By the rotation of the rotating pipe 151, the movable funnel 145 is moved in the axial direction of the intake pipe 147 to thereby vary the length of the intake pipe 147. If the movable funnel 145 is driven by a link mechanism, for example, the link mechanism may largely project from the intake pipe 147 and the number of parts may also be increased. To the contrary, according to the present invention, the movable funnel 145 is driven by rotating the rotating pipe 151 constituting the intake pipe 147. With this arrangement, an increase in number of parts can be suppressed and the size of the variable intake pipe length device 31 can be reduced.

The actuator 148 is provided by an ultrasonic motor, and the rotor of the ultrasonic motor is the rotating pipe 151. Thus, the rotor of the actuator 148 is the rotating pipe 151 which is a part of the intake pipe 147. Accordingly, the number of parts of a driving mechanism for driving the movable funnel 145 can be reduced.

The actuator 148 is provided for each cylinder of the engine 17, so that the length of the intake pipe 147 can be adjusted to an optimum pipe length for each cylinder. Accordingly, the lengths of the exhaust pipes 33, 34, 36 and 37 (see FIG. 1) can be set individually for each cylinder, thereby increasing the flexibility of layout of the exhaust pipes 33, 34, 36 and 37.

FIG. 10 is a plan view of a variable intake pipe length device 170 according to a second preferred embodiment of the present invention. The variable intake pipe length device 170 is adapted to a straight four-cylinder engine. As shown in FIG. 10, the variable intake pipe length device 170 is composed of a base plate 171 and four variable-length air funnels 141 mounted on the base plate 171.

Four actuators 148 (crosshatched areas) are located inside of an envelope 175 (chain line forming an oval shape) formed by the contours of four intake pipes 147, i.e., by the contours of four fixed funnels 144.

In this variable intake pipe length device 170, all of the four actuators 148 for the first to fourth cylinders are operated simultaneously. Alternatively, the two actuators 148 for the first and fourth cylinders are operated simultaneously, and the two actuators 148 for the second and third cylinders are operated simultaneously.

As a modification, the four actuators 148 for the first to fourth cylinders may be operated independently.

FIG. 11 is a plan view of a variable intake pipe length device 180 according to a third preferred embodiment of the present invention. As shown in FIG. 11, the variable intake pipe length device 180 is composed of two intake pipes 184, a base plate 182 for supporting the two intake pipes 184, an electric motor 185 as an actuator provided between the two intake pipes 184 for varying the lengths of the two intake pipes 184, and a power transmitting mechanism 186 for transmitting a drive force from the electric motor 185 to the two intake pipes 184.

FIG. 12 is a cross section taken along the line 12-12 in FIG. 11. As shown in FIG. 12, each intake pipe 184 is composed of a fixed funnel 183 mounted on the base plate 182, a movable funnel 145 movably inserted in the fixed funnel 183, and a rotating pipe 187 for moving the movable funnel 145 by receiving the drive force from the electric motor 185.

In each intake pipe 184, the fixed funnel 183 is a cylindrical member, which is formed with four vertical slits 144a extending axially and two L-shaped mounting hooks 144c formed at the lower end of the fixed funnel 183 so as to be inserted through the respective arcuate slits 142a of the base plate 182 and engaged therewith.

In each intake pipe 184, the rotating pipe 187 is composed of a cylindrical portion 151b inserted in the space 156 between the outer cylinder 145c and the inner cylinder 145e of the movable funnel 145 so as to be projectable from the space 156, an annular projection 187c formed integrally with the cylindrical portion 151b at its lower end so as to contact the inner surface of the fixed funnel 183, and a gear portion 187d formed below the annular projection 187c integrally therewith.

The cylindrical portion 151b is formed with a spiral slit 151a.

The power transmitting mechanism 186 is composed of a drive gear 188 mounted on an output shaft 185a of the electric motor 185 and the gear portions 187d of the two rotating pipes 187, both meshing with the drive gear 188.

Accordingly, by operating the electric motor 185, the two rotating pipes 187 can be rotated simultaneously through the power transmitting mechanism 186, thereby simultaneously moving the two movable funnels 145.

Each intake pipe 184 has an axis 181, which coincides with the axis of rotation of the corresponding rotating pipe 187, and the electric motor 185 has an axis 189.

As shown in FIG. 11, the electric motor 185 and the power transmitting mechanism 186 are located inside of an envelope 178 (chain line forming an oval shape) formed by the contours of the two intake pipes 184, i.e., by the contours of the two fixed funnels 183. Further, the axis 189 of the electric motor 185 is located inside of the envelope 178.

According to the third preferred embodiment shown in FIGS. 11 and 12, the axis 189 of the electric motor 185 as an actuator (drive source) for rotationally driving the rotating pipes 187 extends parallel to the axis 181 of each intake pipe 184 or the axis 181 of each rotating pipe 187. Accordingly, the electric motor 185 can be located closer to each intake pipe 184, so that the variable intake pipe length device 180 can be reduced in size.

FIG. 13 is a perspective view of each fixed funnel 183 shown in FIGS. 11 and 12. As shown in FIG. 13, each fixed funnel 183 is formed with a recess 183a for avoiding the interference with the drive gear 188 (see FIG. 12).

FIG. 14 is a plan view of a variable intake pipe length device 190 according to a fourth preferred embodiment of the present invention. As shown in FIG. 14, the variable intake pipe length device 190 is composed of two intake pipes 184, a base plate 192 for supporting the two intake pipes 184, two electric motors 195 as actuators provided between the two intake pipes 184 for respectively varying the lengths of the two intake pipes 184, and two power transmitting mechanisms 196 for respectively transmitting drive forces from the two electric motors 195 to the two intake pipes 184.

Each power transmitting mechanism 196 is composed of a drive gear 198 mounted on an output shaft 195a of the corresponding electric motor 195 and a gear portion 187d of the corresponding rotating pipe 187, wherein the drive gear 198 is in mesh with the gear portion 187d.

The two electric motors 195 and the two power transmitting mechanisms 196 are located inside of an envelope 178

(chain line forming an oval shape) formed by the contours of the two intake pipes 184, i.e., by the contours of the two fixed funnels 183.

Thus, the two electric motors 195 are respectively provided for the two intake pipes 184, so that the lengths of the two intake pipes 184 can be adjusted independently.

FIG. 15 is a schematic plan view of a variable intake pipe length device 200 according to a fifth preferred embodiment of the present invention. The variable intake pipe length device 200 is provided in an air cleaner box in the vicinity of a straight four-cylinder engine.

The variable intake pipe length device 200 is composed of four intake pipes 201 to 204 respectively provided for the first to fourth cylinders of the straight four-cylinder engine, a base plate 205 for supporting the four intake pipes 201 to 204, a first electric motor 211 provided between the intake pipes 201 and 202 for varying the length of the intake pipe 201, a second electric motor 212 provided between the intake pipes 202 and 203 for varying the lengths of the intake pipes 202 and 203, a third electric motor 213 provided between the intake pipes 203 and 204 for varying the length of the intake pipe 204, a first power transmitting mechanism 216 for transmitting a drive force from the first electric motor 211 to the intake pipe 201, a second power transmitting mechanism 217 for transmitting a drive force from the second electric motor 212 to the intake pipes 202 and 203, and a third power transmitting mechanism 218 for transmitting a drive force from the third electric motor 213 to the intake pipe 204.

The intake pipes 201 to 204 are respectively provided with driven gears 221 to 224 formed on the respective rotating pipes, and the first to third electric motors 211 to 213 are respectively provided with drive gears 226 to 228 mounted on the respective output shafts. The first power transmitting mechanism 216 is composed of the drive gear 226 and the driven gear 221. The second power transmitting mechanism 217 is composed of the drive gear 227 and the driven gears 222 and 223. The third power transmitting mechanism 218 is composed of the drive gear 228 and the driven gear 224.

In FIG. 15, the intake pipe 201 for the first cylinder is symbolized by #1, the intake pipe 202 for the second cylinder is symbolized by #2, the intake pipe 203 for the third cylinder is symbolized by #3, and the intake pipe 204 for the fourth cylinder is symbolized by #4.

The first to third electric motors 211 to 213 and the first to third power transmitting mechanisms 216 to 218 are located inside of an envelope 231 formed by the contours of the four intake pipes 201 to 204.

In this variable intake pipe length device 200, the first and third electric motors 211 and 213 are simultaneously operated.

According to the fifth preferred embodiment shown in FIG. 15, the first and third electric motors 211 and 213 as actuators for the first and fourth cylinders are simultaneously operated, and the second electric motor 212 as a common actuator for the second and third cylinders is singly operated (in the case that two electric motors are respectively provided as actuators for the second and third cylinders, these two electric motors are simultaneously operated). Accordingly, control of the optimum intake pipe lengths in a straight four-cylinder engine can be performed.

FIG. 16 is a schematic plan view of variable intake pipe length devices 180F and 180R according to a sixth preferred embodiment of the present invention. The variable intake pipe length devices 180F and 180R are adapted to be provided in the air cleaner box 123 (see FIG. 2) in the vicinity of the V-type four-cylinder engine 17 (see FIG. 2).

Each of the variable intake pipe length devices 180F and 180R has the same structure as that of the variable intake pipe length device 180 shown in FIG. 11. Here, these symbols are changed for discernment.

The front variable intake pipe length device 180F is composed of two intake pipes 184 for the first and third cylinders in the front cylinder 17A (see FIG. 2), a base plate 182, an electric motor 185, and a power transmitting mechanism 186.

Similarly, the rear variable intake pipe length device 180R is composed of two intake pipes 184 for the second and fourth cylinders in the rear cylinder 17B (see FIG. 2), a base plate 182, an electric motor 185, and a power transmitting mechanism 186.

In FIG. 16, the intake pipe 184 for the first cylinder is symbolized by #1, the intake pipe 184 for the second cylinder is symbolized by #2, the intake pipe 184 for the third cylinder is symbolized by #3, and the intake pipe 184 for the fourth cylinder is symbolized by #4.

Thus, the electric motor 185 is commonly provided for the two intake pipes 184 for the first and third cylinders in the front cylinder 17A, so that the two intake pipes 184 for the first and third cylinders can be simultaneously operated. Further, the electric motor 185 is commonly provided for the two intake pipes 184 for the second and fourth cylinders in the rear cylinder 17B, so that the two intake pipes 184 for the second and fourth cylinders can be simultaneously operated.

Further, the electric motor 185 for the front cylinder 17A and the electric motor 185 for the rear cylinder 17B may be operated simultaneously or independently.

According to the sixth preferred embodiment shown in FIG. 16, the electric motor 185 as a common actuator for the first and third cylinders in the front cylinder 17A (see FIG. 2) as one of the banks is operated to thereby simultaneously operate the two intake pipes 184 for the first and third cylinders, and the electric motor 185 as a common actuator for the second and fourth cylinders in the rear cylinder 17B (see FIG. 2) as the other bank is operated to thereby simultaneously operate the two intake pipes 184 for the second and fourth cylinders. Accordingly, control of the optimum intake pipe lengths in a V-type four-cylinder engine can be performed.

While the length of each intake pipe 147 in the variable intake pipe length device 31 is variable between two values, i.e., the length L2 for a low engine speed region and the length L1 for a high engine speed region as shown in FIG. 5, the length of each intake pipe 147 may be variable among more than two values for various engine speed regions or may be continuously variable according to engine speeds.

Further, as shown in FIG. 15, the first electric motor 211 is provided to operate the intake pipe 201 for the first cylinder, the second electric motor 212 is provided to operate the intake pipes 202 and 203 for the second and third cylinders, and the third electric motor 213 is provided to operate the intake pipe 204 for the fourth cylinder. As a modification, four electric motors may be provided to respectively operate the four intake pipes 201 to 204.

The variable intake pipe length device according to the present invention is applicable to a two-wheel vehicle or a four-wheel vehicle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A vehicle including an intake passage for inducing air from an air cleaner box to an intake port of an engine, comprising:
a variable intake pipe length device including:
one or more intake pipes having a fixed funnel and a movable funnel movable relative to said fixed funnel,
one or more actuators for moving said movable funnel,
wherein said one or more intake pipes are provided in the intake passage for inducing air from the air cleaner box to the intake port of the engine,
wherein said variable intake pipe length device is capable of adjusting the length of said one or more intake pipes by a driving force of said one or more actuators, according to a condition of the engine, and
wherein said one or more actuators are disposed inside an envelope defined by a contour of said one or more intake pipes.

2. The vehicle according to claim 1,
wherein each of said one or more actuators comprises a drive source for generating a rotational force, and
wherein an axis of said one or more actuators extends parallel to an axis of said one or more intake pipes.

3. The vehicle according to claim 2, wherein said one or more actuators are provided inside of the air cleaner box.

4. The vehicle according to claim 3,
wherein each of said one or more intake pipes further includes a rotating pipe which is rotationally driven by said one or more actuators, and
wherein said movable funnel is moved in the axial direction of each of said one or more intake pipes by the rotation of said rotating pipe to thereby vary the length of said one or more intake pipes.

5. The vehicle according to claim 4,
wherein each of said one or more actuators comprises an ultrasonic motor, and
wherein said rotating pipe is a rotor of said ultrasonic motor.

6. The vehicle according to claim 1,
wherein the engine is a multi-cylinder engine, and
wherein one of said one or more actuators is provided for each cylinder of the engine.

7. The vehicle according to claim 6,
wherein the engine is a straight four-cylinder engine,
wherein one of said one or more actuators for a first cylinder of the straight four-cylinder engine and one of said one or more actuators for a fourth cylinder of the straight four-cylinder engine are simultaneously operated, and
wherein one of said one or more actuators for a second cylinder of the straight four-cylinder engine and one of said one or more actuators for a third cylinder of the straight four-cylinder engine are simultaneously operated.

8. The vehicle according to claim 6,
wherein the engine is a V-type four-cylinder engine, and
wherein two of said one or more actuators in a first bank of the V-type four-cylinder engine are simultaneously operated, and
wherein two of said one or more actuators in a second bank of the V-type four-cylinder engine are simultaneously operated.

9. A vehicle including an intake passage for inducing air from an air cleaner box to an intake port of an engine, comprising:
a variable intake pipe length device including:
one or more intake pipes having a fixed funnel and a movable funnel movable relative to said fixed funnel,
one or more actuators for moving said movable funnel,
an axis of said one or more actuators being disposed inside of an envelope defined by a contour of said one or more intake pipes,
wherein said one or more intake pipes are provided in the intake passage for inducing air from the air cleaner box to the intake port of the engine, and
wherein said variable intake pipe length device is capable of adjusting the length of said one or more intake pipes by a driving force of said one or more actuators, according to a condition of the engine.

10. The vehicle according to claim 9,
wherein each of said one or more actuators comprises a drive source for generating a rotational force, and
wherein an axis of said one or more actuators extends parallel to an axis of said one or more intake pipes.

11. The vehicle according to claim 10, wherein said one or more actuators are provided inside of the air cleaner box.

12. The vehicle according to claim 11,
wherein each of said one or more intake pipes further includes a rotating pipe which is rotationally driven by said one or more actuators, and
wherein said movable funnel is moved in the axial direction of each of said one or more intake pipes by the rotation of said rotating pipe to thereby vary the length of said one or more intake pipes.

13. The vehicle according to claim 12,
wherein each of said one or more actuators comprises an ultrasonic motor, and
wherein said rotating pipe is a rotor of said ultrasonic motor.

14. The vehicle according to claim 13, wherein the engine is a multi-cylinder engine, and
wherein one of said one or more actuators is provided for each cylinder of the engine.

15. The vehicle according to claim 14,
wherein the engine is a straight four-cylinder engine,
wherein one of said one or more actuators for a first cylinder of the straight four-cylinder engine and one of said one or more actuators for a fourth cylinder of the straight four-cylinder engine are simultaneously operated, and
wherein one of said one or more actuators for a second cylinder of the straight four-cylinder engine and one of said one or more actuators for a third cylinder of the straight four-cylinder engine are simultaneously operated.

16. The vehicle according to claim 15,
wherein the engine is a V-type four-cylinder engine, and
wherein two of said one or more actuators in a first bank of the V-type four-cylinder engine are simultaneously operated, and
wherein two of said one or more actuators in a second bank of the V-type four-cylinder engine are simultaneously operated.

* * * * *